(12) United States Patent
Bou Balust et al.

(10) Patent No.: US 11,256,741 B2
(45) Date of Patent: Feb. 22, 2022

(54) VIDEO TAGGING SYSTEM AND METHOD

(71) Applicant: Vertex Capital LLC, Wilmington, DE (US)

(72) Inventors: Elisenda Bou Balust, Barcelona (ES); Juan Carlos Riveiro Insua, Menlo Park, CA (US); Delia Fernandez Cañellas, Barcelona (ES); Joan Espadaler Rodes, Barcelona (ES); Asier Aduriz Berasategi, Barcelona (ES); David Varas Gonzalez, Barcelona (ES)

(73) Assignee: Vertex Capital LLC, Wilmington, DE (US)

( * ) Notice: Subject to any disclaimer, the term of this patent is extended or adjusted under 35 U.S.C. 154(b) by 298 days.

(21) Appl. No.: 16/346,102

(22) PCT Filed: Oct. 30, 2017

(86) PCT No.: PCT/US2017/059119
§ 371 (c)(1),
(2) Date: Apr. 29, 2019

(87) PCT Pub. No.: WO2018/081751
PCT Pub. Date: May 3, 2018

(65) Prior Publication Data
US 2019/0258671 A1     Aug. 22, 2019

Related U.S. Application Data

(60) Provisional application No. 62/414,308, filed on Oct. 28, 2016, provisional application No. 62/552,369, filed on Aug. 30, 2017.

(51) Int. Cl.
*G06F 16/71*     (2019.01)
*G06F 40/30*     (2020.01)
(Continued)

(52) U.S. Cl.
CPC .............. *G06F 16/71* (2019.01); *G06F 16/00* (2019.01); *G06F 16/73* (2019.01); *G06F 16/783* (2019.01);
(Continued)

(58) Field of Classification Search
USPC ................................................. 386/239–248
See application file for complete search history.

(56) References Cited

U.S. PATENT DOCUMENTS 7,203,380 B2    4/2007   Chiu et al.
8,595,773 B1   11/2013   Wang
(Continued)

OTHER PUBLICATIONS

L. Li, R. Socher and L. Fei-Fei, "Towards total scene understanding: Classification, annotation and segmentation in an automatic framework," 2009 IEEE Conference on Computer Vision and Pattern Recognition, Miami, FL, USA, 2009, pp. 2036-2043, doi: 10.1109/CVPR.2009.5206718. (Year: 2009).*
(Continued)

*Primary Examiner* — Hung Q Dang
(74) *Attorney, Agent, or Firm* — Blank Rome LLP

(57) ABSTRACT

An automatic video tagging system which learns from videos, their web context and comments shared on social networks is described. Massive multimedia collections are analyzed by Internet crawling and a knowledge base is maintained that updates in real time with no need of human supervision. As a result, each video is indexed with a rich set of labels and linked with other related contents. Practical applications of video recognition require a label scheme that is appealing to the end-user (i.e. obtained from social curation) and a training dataset that can be updated in real-time to be able to recognize new actions, scenes and people. To create this dataset that evolves in real-time and uses labels that are relevant to the users, a weakly-supervised deep learning approach is utilized combining both a
(Continued)

machine-learning pre-processing stage together with a set of keywords obtained from the internet. The resulting tags combined with videos and summaries of videos are used with deep learning to train a neural network in an unsupervised manner that allows the tagging system to go from an image to a set of tags for the image and then to the visual representation of a tag.

20 Claims, 15 Drawing Sheets

(51) Int. Cl.
| | |
|---|---|
| *G06N 3/08* | (2006.01) |
| *G06N 5/02* | (2006.01) |
| *G06N 3/04* | (2006.01) |
| *G06F 16/00* | (2019.01) |
| *G06F 16/783* | (2019.01) |
| *G06F 16/78* | (2019.01) |
| *G06F 16/73* | (2019.01) |
| *G06K 9/00* | (2006.01) |
| *G11B 27/34* | (2006.01) |
| *G06F 16/75* | (2019.01) |

(52) U.S. Cl.
CPC .......... *G06F 16/7867* (2019.01); *G06F 40/30* (2020.01); *G06K 9/00751* (2013.01); *G06N 3/0454* (2013.01); *G06N 3/08* (2013.01); *G06N 3/084* (2013.01); *G06N 3/088* (2013.01); *G06N 5/022* (2013.01); *G11B 27/34* (2013.01)

(56) References Cited

U.S. PATENT DOCUMENTS

| | | | |
|---|---|---|---|
| 8,965,786 | B1 | 2/2015 | Frumkin |
| 2008/0228749 | A1 | 9/2008 | Brown |
| 2009/0119151 | A1 | 5/2009 | deHeer |
| 2009/0136141 | A1 | 5/2009 | Badawy et al. |
| 2009/0210899 | A1 | 8/2009 | Lawrence-Apfelbaum et al. |
| 2010/0125581 | A1 | 5/2010 | Peleg et al. |
| 2010/0289959 | A1 | 11/2010 | Fonseca et al. |
| 2012/0075490 | A1* | 3/2012 | Tsai ............... G11B 27/034 348/222.1 |
| 2012/0123780 | A1 | 5/2012 | Gao et al. |
| 2012/0201472 | A1 | 8/2012 | Blanchflower et al. |
| 2013/0074105 | A1 | 3/2013 | Gudlavenkatasiva et al. |
| 2013/0081082 | A1 | 3/2013 | Rieiro Insua et al. |
| 2013/0132199 | A1 | 5/2013 | Croy |
| 2014/0075463 | A1 | 3/2014 | Kamdar |
| 2014/0181668 | A1* | 6/2014 | Kritt ............. H04N 21/234318 715/719 |
| 2014/0201472 | A1 | 7/2014 | Zadel et al. |
| 2015/0089520 | A1 | 3/2015 | Lee et al. |
| 2015/0134673 | A1 | 5/2015 | Golan et al. |

OTHER PUBLICATIONS

EP 17866015.5, Extended European Search Report dated Mar. 12, 2020.
Duarte Leonardo A et al.: "Bag of Genres for Video Retrieval", 2016 29th SIBGRAPI Conference on Graphics, Patterns and Images (SIBGRAPI), IEEE, Oct. 4, 2016 (Oct. 4, 2016), pp. 257-264.
Wei Long Yang et al: "Discriminative tag learning on YouTube videos with latent sub-tags", Computer Vision and Pattern Recognition (CVPR), 2011 IEEE Conference on, IEEE, Jun. 20, 2011 (Jun. 20, 2011), pp. 3217-3224.

* cited by examiner

TOP-5 PREDICTED

Water Sport
Outdoor Recreation
Gold Medal
The 2016 Rio Olympic Games
Boat

GROUND TRUTH

Water Sport
Female
Vehicle
Outdoor Recreation
Boat
Gold Medal
The 2016 Rio Olympic Games

| ViTS | YouTube-8M |
|---|---|
| Thomas Robinson<br>Sacramento Kings<br>New Jersey<br>Sport<br>2012 NBA Draft | Basketball |

VIDEO TAGGING SYSTEM AND METHOD

CROSS-REFERENCE TO RELATED APPLICATIONS

This application is a 371 of U.S. PCT application Ser. No. PCT/US2017/059119 filed Oct. 30, 2017, which in turn claims priority to U.S. Provisional Application No. 62/414,308 filed on Oct. 28, 2016 and to U.S. Provisional Application No. 62/552,369, filed on Aug. 30, 2017. All of the above applications are hereby incorporated herein by reference.

BACKGROUND

In the recent years, video sharing in social media from different video recording devices has resulted in an exponential growth of videos on the Internet. Such video data is continuously increasing with daily recordings from a wide number of topics. In this context, video understanding has become a critical problem to address. Manually labeling these data is extremely expensive and unfeasible in practice, therefore automatic methods for large-scale annotation are needed. Video search and indexation benefits from the use of keyword tags related to the video content, but most of the shared video content does not contain tags. Although the use of deep learning has become a huge revolution for image analysis in several areas, video domain is still a relatively unexplored field for these type of methods.

Deep Learning has been used to learn models from raw videos. In "Very Deep Convolutional Networks for Large-Scale Image Recognition", Simonyan and Zisserman, a network to perform robust action recognition is presented. 3D ConvNets are used to learn spatiotemporal features from a large-scale dataset in "Learning Spatiotemporal Features With 3D Convolutional Networks", Tran et al. Although these techniques obtain promising results on action categorization tasks, they are limited to predict a single label per video and thus loosing part of the semantic understanding of the video.

Current approaches to perform video tagging with multiple tags and creating large datasets for video understanding have been released by multiple sources. These include YouTube-8M with 8M videos [see "YouTube-8M: A Large-Scale Video Classification Benchmark", Abu-El-Haija et al.], FCVID with 91 k videos [see "Exploiting Feature and Class Relationships in Video Categorization with Regularized Deep Neural Networks", Jiang et al.], EventNet with 95 k videos [see "EventNet: A Large Scale Structured Concept Library for Complex Event Detection in Video", Ye et al.], YFCC-100M with 800 k videos [see "The New Data and New Challenges in Multimedia Research", Thomee et al.], Sports-1M with 1M videos [see "Large-Scale Video Classification with Convolutional Neural Networks", Karpathy et al.] and Kinetics [see "The Kinetics Human Action Video Dataset", Kay et al.]. Labels are available for these datasets to train and evaluate computer vision solutions in public benchmarks [see "Deep Residual Learning for Image Recognition", He et al., "Batch Normalization: Accelerating Deep Network Training by Reducing Internal Covariate Shift", Ioffe and Szegedy, and "Imagenet classification with deep convolutional neural networks", Krizhevsky et al.]. In this context, almost all current video benchmarks are restricted to recognizing action and activity. However, state-of-the-art applications of video recognition require the ability to understand a huge amount of labels which can be particularized up to very specific objects, brands and people at the individual level. To do that, a larger vocabulary that evolves and grows with time is required.

Despite the significant advances of such systems, their results are still restricted to the concepts annotated in the dataset, which typically corresponds to a single tag per video. This limitation is not acceptable for a real world application targeting a dynamic domain such as social media, news, entertainment or unstructured video data. For these cases, the vocabulary of labels needs an ontology-based structure, and the relations between concepts must incorporate a temporal dimension to capture the changing realities in our societies.

SUMMARY

An automatic video tagging system which learns from videos, their web context and comments shared on social networks is described. Massive multimedia collections are analyzed by Internet crawling and a knowledge base is maintained that updates in real time with no need of human supervision. As a result, each video is indexed with a rich set of labels and linked with other related contents. Practical applications of video recognition require a label scheme that is appealing to the end-user (i.e. obtained from social curation) and a training dataset that can be updated in real-time to be able to recognize new actions, scenes and people. To create this dataset that evolves in real-time and uses labels that are relevant to the users, a weakly-supervised deep learning approach is utilized combining both a machine-learning pre-processing stage together with a set of keywords obtained from the internet. The resulting tags combined with videos and summaries of videos are used with deep learning to train a neural network in an unsupervised manner that allows the tagging system to go from an image to a set of tags for the image and then to the visual representation of a tag.

DETAILED DESCRIPTION

Figure 1:
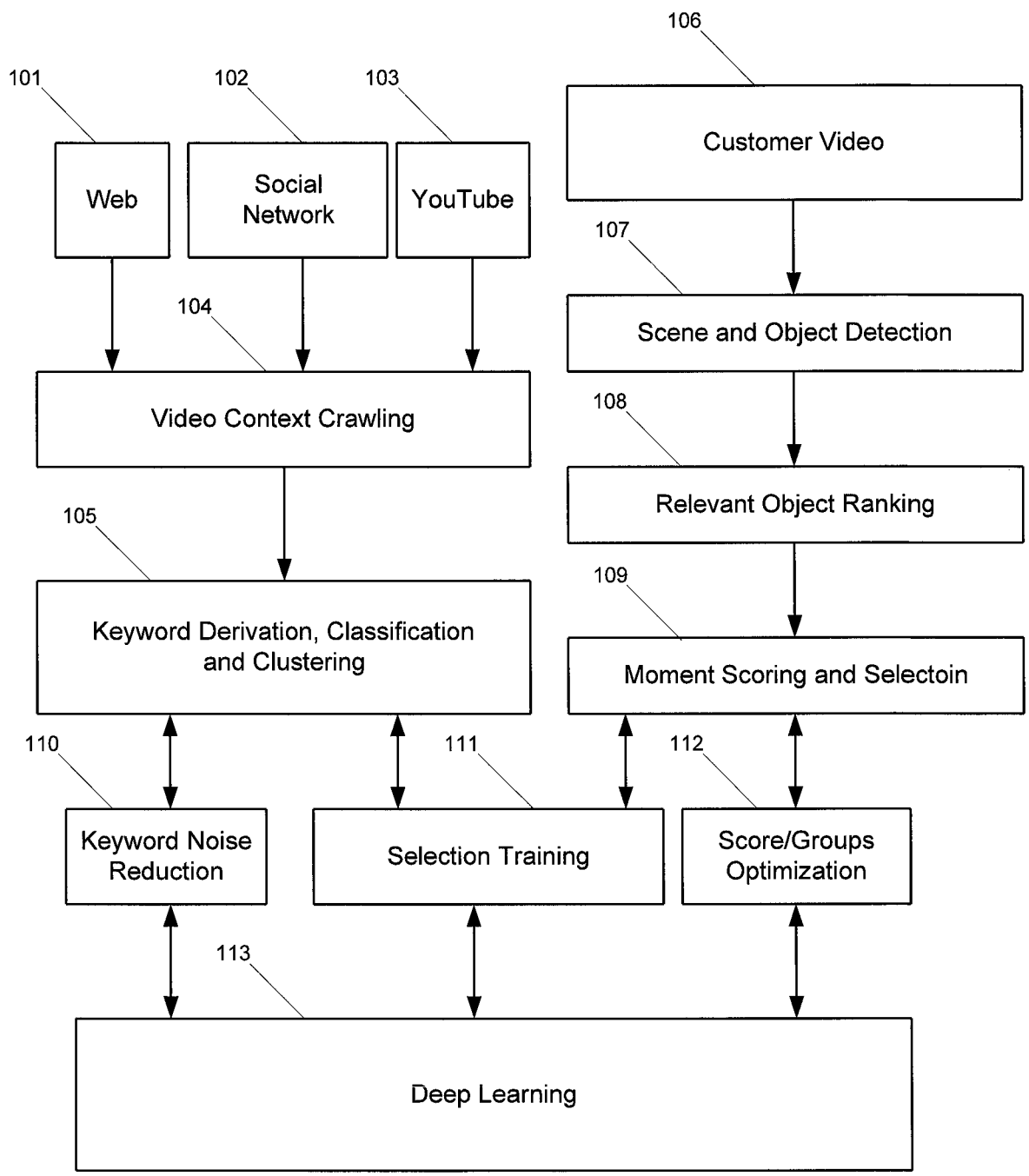
FIG. 1 illustrates a block diagram of an embodiment of the invention.

In one embodiment of the invention, the architecture combines three different blocks: first, a video action summarization that is in charge of analyzing the full video using Machine Learning (ML) techniques and selecting the relevant scenes that contain most of the video information. Then, the label retrieval (Video Contextual Crawling) block queries the Internet to find associated tags within the full video. The outputs of these two blocks (a set of images corresponding to the relevant scenes together with a set of tags) are combined trough a Deep-Learning scheme to train the network. The structure of the framework is presented in FIG. 1. Video Context Crawling 104 receives input from one or more sources including the Web 101, Social Network Sites 102 and YouTube 103. Next Keyword Derivation, Classification and Clustering 105 receives input from Video Context Crawling 104 and generates keywords. Independently Customer Videos 106 go through Scene and Object Detection 107 and Relevant Object Ranking 108 to arrive at Moment Scoring and Selection 109 where summaries of the customer videos are generated. Deep Learning 113 is fed by the keywords and the summaries after processing by Keyword Noise Reduction 110, Selection Training 111 and Score/Groups Optimization 112.

The objective of the video action summarization pre-processing stage is to reduce the length of the video to a set of relevant moments and actions. To this end, a set of video recognition and audio analysis techniques are applied aiming at the identification and extraction of uncorrelated 5-second clips that contain the most representative scenes, characters and objects of the video under analysis. A system for video summarization is described in U.S. Pat. No. 8,869,198, assigned to the applicant of the present application and hereby incorporated by reference. An application of video summarization to advertising is described in U.S. Patent Application Publication No. 2017/0055014, assigned to the applicant of the present application and hereby incorporated by reference.

Video Action Summarization is obtained using a combination of motion detection and color (optical flow detection) to create an initial segmentation in the video frames, followed by a feature vector extraction to track all potential objects together using pixel tracking, motion detection and color. In this block, the objects are segmented within the frames and then tracked along the sequence in order to decide if they are relevant objects or part of the background. Video stabilization techniques are also used to compensate camera movement.

K-means clustering is then used both within the frame and over time to segment the objects that have to be tracked. Once this is done, the object score is created for each object found in the video based on the size of the object, focus/position over each frame and frequency of occurrence within the whole video. Pre-trained machine learning blocks to detect specific relevant objects such as faces, bodies, cars, balls, animals and other key elements within a scene are used to calculate the relevance of the object and to enable a more fine-grain object scoring. Finally, several pre-trained filters are used to detect some specific actions such as running and playing which are also integrated within the scoring function. The segment score is then calculated by adding the object scores and action scores for all the elements that have been tracked in a segment of video that contains the same background.

Labels are retrieved for each video using a combination of web scraping and/or social media networks and/or proprietary or public datasets, thus generating a dataset of tags that is associated with the video summaries. The tag retrieval procedure operates as follows: first, the text corpus, metadata, title and description are parsed from the video page (the page where the video has been published). Also, all social media posts where the video has been published are retrieved from Facebook, Twitter and YouTube. From these two corpus, we obtain 30 relevant keywords (dataset-1). The number of keywords may vary depending on the algorithm used and in alternative embodiments a different number of relevant keywords are used. To extend these keywords and relate them to the topics that are relevant to the audience in social networks, we generate a set of bigrams based on dataset-1, used to query social networks and to find any posts related to the video content but that might not contain the original video. In alternative embodiments n-grams are generated for n greater than two. Another 30 keywords are then obtained from these posts, creating the dataset-2. In alternative embodiments a number more or less than 30 keywords can be used.

These two datasets (dataset-1 and dataset-2) are parsed to a universal semantic representation. Finally, the resulting candidates are filtered by building a graph of connections, ordering them by importance and deleting the most isolated candidates.

In our dataset we have several training videos, each of which is labeled with one or more tags. However, the dataset does not contain information about where each tag occurs in the sequence. Our task is to classify whether an unknown test video contains each one of these tags. We use a weakly-supervised approach where a neural network predicts the tags of each frame independently and an aggregation layer computes the tags for the whole video based on the individual tags of each frame.

Each video is represented by a set of frames:

$$\{f_i\}_{i=1}^{F}$$

extracted from the original video as explained above. In this dataset, the frames might belong to different parts of the video. Because of this we process each frame within the video independently. To process each frame we use a neural network which takes a single frame fi as an input and its output models the probability of each one of the tags being present in that given frame:

$$O(f_i) = [p_{i,1}\ p_{i,2} \ldots p_{i,T}]$$

where T is the number of possible tags to be assigned. As the information about the tags present at each frame is not available to perform the training of the network, we compute an aggregation of the tags predicted for each frame extracted from the video. The result of this aggregation models the probability of each tag being present in the video.

$$p_j = \mathrm{Aggr}([p_{1,j}\ p_{2,j} \ldots p_{F,j}])$$

In the experiments, we use a pre-trained GoogleNet [see "Going Deeper with Convolutions", Szegedy et al.] network to model O(fi). In an alternative embodiment, another neural network could be used. The number of possible tags to be assigned (T) is 381 in one implementation. We have replaced the last layer to make the output space match the number of tags of our dataset. The aggregation function we use is:

$$\mathrm{Aggr}([p_{1,j}\ p_{2,j} \ldots p_{F,j}]) = \tan h(\Sigma_i p_{i,j})$$

In this setup, the whole network is differentiable, so we can train it by backpropagation. Let t denote the ground-truth tags for a given video and p the predicted probability of a tag being present in the video. The parameters of the network are updated with the gradient of the loss function, given by:

$$L = -\Sigma_j t_j \log(p_j)$$

Experimental Results

The result of the scheme is a Video Recognition Database consisting of 10M scenes that is growing every day. To illustrate the accuracy of the results, a set of 40 k videos related to the Sports theme has been obtained from YouTube and used for training and testing the aforementioned ML-DL framework. The YouTube videos are downloaded and summarized through the Video Action Summarization block. After that, the tags corresponding to these videos are obtained through the label retrieval block and used to train our network. Finally, a test split (consisting of 8 k videos) is used and compared to the YouTube tags obtained through the YouTube API. In Table 1, the results for the set of 40 k YouTube videos (200 k scenes) corresponding to a vocabulary of 716 labels with an average of 9.3 labels per video are presented using 6 different metrics. These metrics compare the vector of tags predicted with our framework with the annotated tags.

TABLE 1

| Metric | Split | Value |
|---|---|---|
| F1-score | test | 0.7313 |
| TP > 1, FP = 0 | test | 0.6038 |
| Hamming accuracy | test | 0.5765 |
| Hamming loss | test | 0.0081 |
| Cosine similarity | test | 0.6996 |
| Exact match | test | 0.1579 |

Figure 2:
FIG. 2 illustrates experimental results obtained using an embodiment of the invention.
Figure 2:
Figure 2:
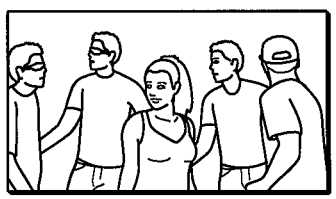
Figure 2:
Figure 2:
Figure 2:
Figure 2:
Figure 2:
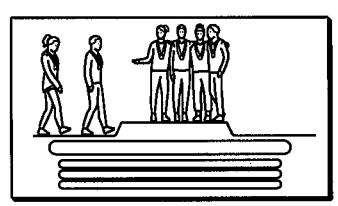
Figure 2:
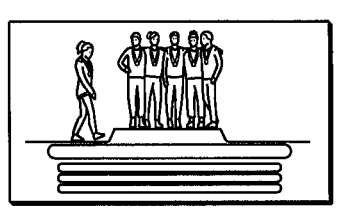
Figure 2:
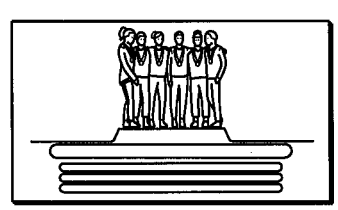
Figure 3:
FIG. 3 illustrates experimental results obtained using an embodiment of the invention.

As it can be observed in Table 1, the technique for video tagging obtains robust results using the common metrics. For illustration purposes, some qualitative results are showed in FIG. 2 and FIG. 3. As it can be seen, the top-5 predicted tags target both generic concepts (water sport, individual sport) and specific identities (The 2016 Rio Olympic Games, DC Shoes, Rob Dyrdek).

We utilize a Weakly Supervised Deep Learning framework to perform video tagging towards the generation of large datasets of labeled videos. The approach—which has been used to create a dataset of 10M tagged videos and is updated every day—has been described and benchmarked. The results have been obtained by processing and analyzing a set of 40 k YouTube videos (200 k scenes) and comparing the predicted labels by the network with those from YouTube, obtaining an accuracy of 0.73 with the F1 score, widely used in the literature.

1. ViTS

One embodiment of the invention, referred to herein as ViTS, is an automatic Video Tagging System developed for large scale video tagging and summarization. The tagging algorithm is based on the extraction of keywords from the contextual information (we use "contextual information" to refer to all the text information associated to a video URL (i.e. title, description or metadata)). Unlike other tagging frameworks based on closed vocabularies, our method is capable to detect real world new events, trends and concept-relation changes in real time. Having this kind of information allows for several applications such as trends detection, content-based video recommendation or indexation of large video-corpus, allowing for very specific searches of content.

As described above, a key aspect of an embodiment of the invention is an online framework that crawls the web to index video documents as summaries of five seconds and a set of contextual tags. In parallel, a KG is maintained that updates over time and learns new world relations, based on the analysis of related social media or other input databases. This framework is the base of an industrial product for real-time tagging of videos crawled from the Internet, which is currently indexing over 150 k videos/month.

2. Related Work

The explosion of multimedia content on the Internet generated a lot of interest on automatically annotating and indexing this content. In literature we find many Content Based Visual Retrieval (CBVR) works, which compute perceptual descriptors capable of recognizing and indexing visual content. For example, in "Building a Webscale Image Similarity Search System", Batko et al., a large scale image similarity search system is presented. Other works have been studding visual semantics for large scale annotation, such as: "Large-Scale Image Annotation Using Visual Synset", Tsai et al., "ARISTA—Image Search to Annotation on Billions of Web Photos", Wang et al., and "LIvRE: A Video Extension to the LIRE Content-Based Image Retrieval System", Oliveira Barra. Most recent works approach the problem with deep learning schemes which prove great performance [see "Deep Learning for Content-Based Video Retrieval in Film and Television Production", Muhling et al., "Deep Learning for Content-Based Image Retrieval: A Comprehensive Study", Wan et al.]. However, CBVR methods require a lot of computational resources and are sometimes not feasible for large scale and real time applications as the one targeting in this work. Moreover, large datasets are needed to train deep learning methods capable of recognizing large vocabularies of visual concepts.

In this context, a lot of effort has been applied into generating large scale datasets to train these systems: e.g. Sports-1M [see "Large-Scale Video Classification with Convolutional Neural Networks", Karpathy et al.] (1M videos and 500 labels) for sport recognition, ActivityNet [see "Activitynet: A Large-Scale Video Benchmark for Human Activity Understanding" Caba Heilbron et al.] (20 k videos and 200 labels) for human activities, EventNet [see "EventNet: A Large Scale Structured Concept Library for Complex Event Detection in Video", Ye et al.] (95 k videos and 500 labels) for event-specific concepts, FCVID [see "Exploiting Feature and Class Relationships in Video Categorization with Regularized Deep Neural Networks", Jiang et al.] (91 k videos and 239 labels) for categories and actions, and YouTube-8M [see "YouTube-8M: A Large-Scale Video Classification Benchmark", Abu-El-Haija et al.] (8M videos and 4.8 k labels) for actions and relevant objects describing the video. Nevertheless, all these datasets but YouTube-8M, include only a few thousands of videos and the vocabulary is restricted to a few hundred of categories. Also, these vocabularies are usually very specific and not extensive to all multimedia content description and real world applications.

ViTS addresses the video indexing problem from a context-based perspective, where a light-computation solution exploit additional information associated to the video. For example, the text and metadata available in the web page where the video is embedded [see "How Flickr Helps Us Make Sense Of The World: Context And Content In Community-Contributed Media Collections", Kennedy et al., "Realtime Near-Duplicate Elimination for Web Video Search with Content and Context", Wu et al., and "Analyzing Flickr Metadata to Extract Location-Based Information and Semantically Organize Its Photo Content", Spyrou and Mylonas], or referred comments on social networks [see "Modeling personal and social network context for event annotation in images", Shevade et al.]. Contextual information coming from different sources requires an adaptation to unify the set of semantics used for machine tagging. In "Large-Scale Concept Ontology for Multimedia", Naphade et al., a 1 k concepts taxonomy called Large-Scale Concept Ontology for Multimedia (LSCOM) is presented with the purpose of standardizing multimedia annotations. Other popular models used to label multimedia content are Knowledge Bases, such as Freebase [see "Freebase: A Collaboratively Created Graph Database For Structuring Human Knowledge", Bollacker et al.], WordNet [see "WordNet: A Lexical Database for English", Miller], OpenCyc ["An Introduction to the Syntax and Content of Cyc", Matuszek et al.], Wikidata [see "Wikidata: A Free Collaborative Knowledgebase", Vrandecic and Krotzsch] or DBPedia [see "DBPedia: A Nucleus for A Web of Open Data", Auer et al.]. Recent large dataset vocabulary's highly used in research are based on this kind of generic entities, e.g. ImageNet [see "Imagenet: A Large-Scale Hierarchical Image Database", Deng et al.] and VisualGenome datasets [see "Visual Genome: Connecting Language And Vision Using Crowdsourced Dense Image Annotations", Krishna et al.] based on WordNet synsets, or YouTube-8M dataset [see "YouTube-8M: A Large-Scale Video Classification Benchmark", Abu-El-Haija et al.] based on Google Knowledge Graph (GKG) (GKG is the extension of Freebase, since Google acquired it) entities. This knowledge entities have many advantages compared to regular word-based vocabularies, as they standardize labels, structure the knowledge in a universal representation and model common sense. Some works are already exploring this knowledge bases to improve image classification [see "The More You Know: Using Knowledge Graphs for Image Classification", Marino et al.] and question answering models [see "Reasoning About Object Affordances in A Knowledge Base Representation", Zhu et al.]. Even the use of this knowledge bases is proving high potential, it is still a weakly explored field.

3. Knowledge Graph

The basic semantic unit generated by ViTS are concepts in a Knowledge Graph (KG). These concepts correspond to universal semantic representations of words. So, while words are dependent from a specific language, concepts are represented by words from different languages. The semantics associated to the concepts can be refined and updated based on the new information crawled by ViTS from the Internet. Concepts allow to merge synonymous keywords or alias under the same concept ID, i.e. the US basketball team "Golden State Warriors" is also referred as "San Francisco Warriors" or "Dubs", so they all represent the same semantics. Concepts are also useful to discriminate between homonym words, i.e. the word "Queen" would map to a music band concept if appearing in a music-related context, while it would be mapped to "Elizabeth II" if appearing in a context related to the British monarchy.

ViTS uses unique concept ID representations. From each concept we save in our database its description, alias (different ways how a concept can be named) in different languages, types and its Freebase (whenever available) and Wikidata ID references, so we can crawl the data sources if more information is needed in a future. Also, for each concept we define a tag to be displayed in every available language, which we call tag to show. In this work we use "tag" to refer to the final concept translated into its tag to show. In Table 2 an example of the information saved into the database for the tag "New York" is shown.

TABLE 2

| Wikidata ID | Freebase ID | Description | Types | Alias (Language) |
|---|---|---|---|---|
| Q60 | /m/02_286 | City in New York | Place, City, Administrative Area | New York City (en) The Big Apple (en) New York (en) NYC (en) City of New York (en) New Amsterdam (en) Nueva York (es) Ciudad de Nueva York (es) Nova Iorque (pt) New York (tr) |

This knowledge base results in a collection of over 2.5M KG entities, corresponding to multilingual vocabulary of over 5M words. Notice that the size of this collection constantly grows when new concepts are found on the Internet.

ViTS also tracks the relations between concepts, represented by a score value that weights the strength of the link. This score is represented in a sparse relational matrix R, of dimensions nxn, where n is the total number of concepts. Each element in R represents the relation $r_{ij}$ between two concepts $c_i$, $c_j$. The relation score $r_{ij}$ between two concepts $c_i$, $c_j$ is related to the frequency by which the two concepts co-occur in the same video:

$$r_{ij} = \frac{N_{V_{c_i} \cap V_{c_j}}}{N_{V_{c_i}}}$$

where $N_{V_{ci} \cap V_{cj}}$ is the number of videos where concept ci has been assigned together with concept $c_j$, and $N_{V_{ci}}$ is the total number of videos where concept ci has been assigned. Notice that matrix R is not symmetric, as relations $r_{ij}$ and $r_{ji}$ are different. This model allows quantifying the relations between two concepts at a low computational cost. This matrix can be updated and recalculated in real time, allowing us to quickly adapt to new events occurring in the world. Moreover, it can be time specific, taking into account only videos recorded during a temporal window. This approach is faster than word embedding [see "Distributed Representations of Words and Phrases and Their Compositionality", Mikolov et al., "Enriching Word Vectors with Subword Information", Bojanowski et al.], which have a much higher computational burden, especially when adding new concepts that would require re-training a deep learning model. To illustrate the learned relations, the R matrix can be projected into a 2 dimensional space with a Multidimensional Scaling (MDS) algorithm [see "Multidimensional Scaling", Kruskal and Wish]. Learned relations in R generate clusters in such a projection.

Another embodiment for such relationships can be generated using concept-embeddings (concept-space models) which allow for a faster operation at a higher computational training cost. In such a model, each concept is represented by a vector in a multi-dimensional representation space.

4. Video Indexing

Figure 4:
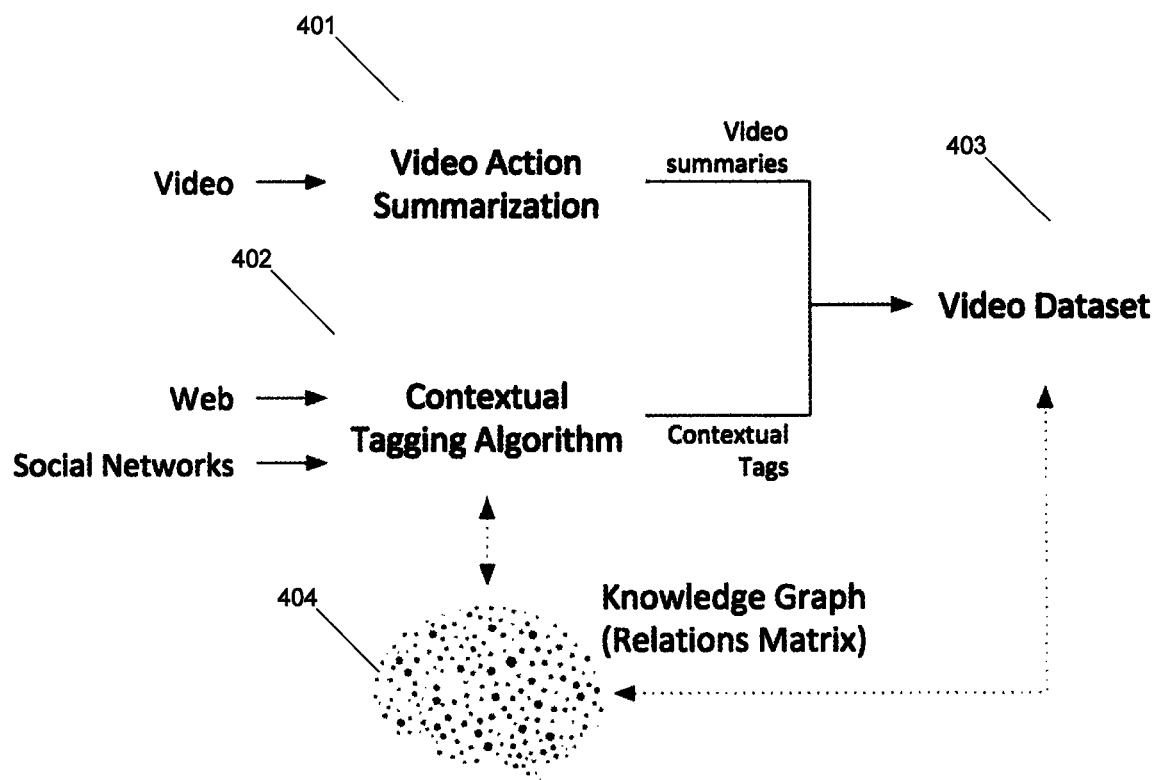
FIG. 4 illustrates a block diagram of an embodiment of the invention.
Figure 5:
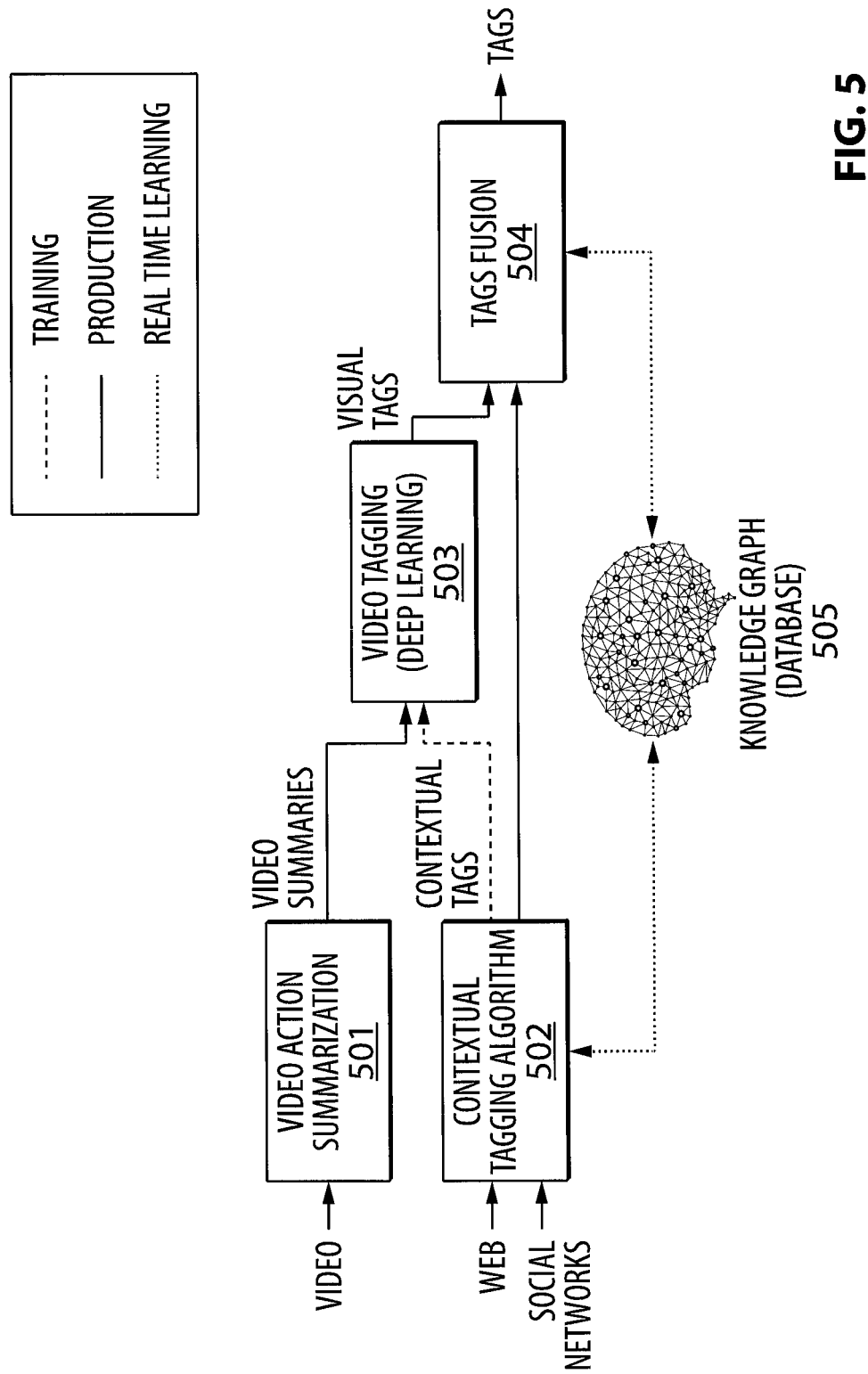
FIG. 5 illustrates a block diagram of an embodiment of the invention.

This section presents the system architecture of ViTS, which is depicted in FIG. 4 and FIG. 5. The first block is the Video Action Summarization algorithm 401, 501 that analyzes the full video using computer vision techniques to select relevant scenes. The second block is the Contextual Tagging Algorithm 402, 502, which crawls the Internet to find keywords associated to the indexed videos and maps them to entities in the KG 404, 505. The next subsections describe these two blocks in detail. FIG. 4 also illustrates Video Dataset 403 which is a repository of videos for training. FIG. 5 also illustrates Deep Learning block 503 and Tags Fusion block 504. Lines in FIG. 5 illustrate the communication paths that are used for training (dashed lines), communication paths used for production (solid lines) and communication paths involved in real time learning (dotted lines).

4.1 Video Action Summarization

The goal of the video action summarization block is the automatic selection of those video segments that allow a rough understanding of the semantic contents of the video. We consider as relevant moments those scenes that would capture viewer's attention: i.e. high action and close-ups. To this end, a set of computer vision techniques are applied to identify and extract uncorrelated clips that contain the most representative scenes, characters and objects of the video under analysis. The length of the summaries must fulfill a trade-off between being long enough to capture a whole action, but being also short enough not to mix more than one activity. In particular, ViTS builds summaries of between 3-5 seconds long.

The algorithm for video action summarization firstly segments the video into sequences with a potential of containing rich semantic information and, secondly, the relevance of each segment is estimated based on an action and object recognition engines. The details of this algorithm follows:

The algorithm for video action summarization begins with a temporal partitioning of the video into segments based on the changes of color and motion by using optical flow. The resulting segments are stabilized to compensate any camera motion. Then, objects are detected and tracked based on K-means clustering across space and time. Each object is assigned a score that takes into consideration their size, focus and position over each frame, as well as the frequency of occurrence within the whole video. In addition, the optical flow is further analyzed to compute an action score based on recognizing a set of predefined activities such as running or playing sports. Finally, a Video Segment Score is computed by summing the object and action scores, so that the N most relevant segments are kept as video summaries.

4.2 Contextual Tagging

Figure 6:
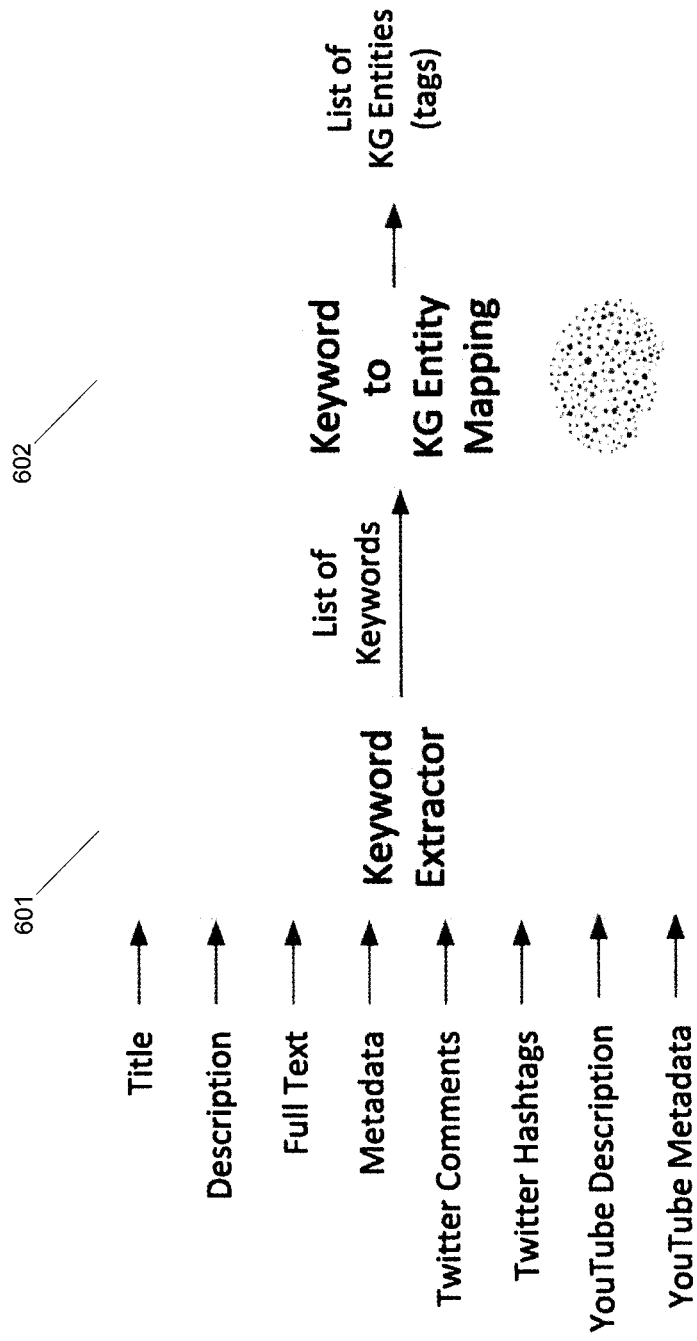
FIG. 6 illustrates a scheme of the contextual tagging algorithm in an embodiment.

The videos crawled by ViTS are indexed with a rich collection of tags associated to the concepts of the KG, introduced in Section 3. The tags are generated after a combination of web scraping and social media networks. The Contextual Tagging algorithm illustrated in FIG. 6 consists of two differentiated parts: 1) keyword extraction from Internet crawling 601 (described in subsection 4.2.1) and 2) keyword mapping to KG entities 602 (described in subsection 4.2.2). Finally, concepts are translated to tags using its predefined tag to show in a given language, and are ranked for display reasons, as described in 4.2.3

4.2.1 Keyword Extraction from Internet Crawling

The first step towards the generation of rich tags is retrieving possible keywords available on Internet related to the indexed video. The web page where the video is embedded is parsed, so that the page title, description, text corpus and metadata are extracted from it. All Twitter posts where the video URL has been shared are also retrieved using Twitter-API 6 and parsed as well. YouTube is also crawled through YouTube Data API 7 in search of videos with the same title. If found, its related information (description and metadata) is also collected. Once all text information is gathered, keywords are extracted using Natural Language Processing (NLP) techniques, which may differ depending on the text length and format of the extracted keywords:

a. Long text (>150 words): stop words are removed and keywords are extracted using a Keyword Extraction Algorithm such as the Rapid Automatic Keyword Extraction (RAKE) algorithm or other NLP extraction algorithms. Thresholds are variable and depend upon the algorithm and in alternative embodiments a different threshold other than 150 could be used.

b. Short text (<=150 words), descriptions, titles and other short contents: stop words are removed and n-grams are constructed by combining consecutive words. Each keyword is composed by n n-grams, e.g. being n=3, from the title "What reduced crime in New York City" we would get the n-grams: [reduced, reduced crime, reduced crime New], [crime, crime New, crime New York], [New, New York, N.Y. City], [York, York City] and [City], where each block of n-grams is processed as an independent keyword. Thresholds are variable and depend upon the algorithm and in alternative embodiments a different threshold other than 150 could be used.

c. Tags from metadata: if there are already tags associated to the video, no further processing is done. These words are directly considered keywords.

d. Twitter text: only the most repeated words in tweets are considered relevant and selected as keywords. The RAKE algorithm or other Keyword Extraction algorithms are used for this task.

e. Twitter hashtags: if hashtags are composed by several words, they are split by capital letters and selected as keywords.

Finally, repeating keyword candidates are removed before generating the final list.

4.2.2 Keyword Mapping to Knowledge Graph Entities

The keywords extracted with the strategies presented in Section 4.2.1 must be matched with the entities of the KG introduced in Section 3. For each keyword, we retrieve a list of concept candidates from the KG in our database. In particular, we search for concepts represented by similar words in the source language by using a fast text search technique which queries the keyword lexeme and returns the matching alias.

The retrieved concepts are ranked by summing two types of concept scores: an intra-score and an inter-score. Their definition is presented in the next paragraphs.

The concept intra-score is computed by using the information of the concept itself and it is composed of different terms. Firstly, the Levenshtein distance is computed between the keyword and the matching concept aliases. In alternative embodiments, another distance computation is used. The Levenshtein distance corresponds to the number of deletions, insertions, or substitutions required to transform one word into another, normalized by the number of letters; i.e. if the keyword and alias are the same the distance between them is zero and it increases depending on the amount of changes needed for this two words to be the same. As we want to have a similarity score, we convert the distance into a score as $s=1-d$. Secondly, a concept usability score estimates how often the concept is used. It is computed as the linear combination of the concept historical usability and concept recent usability, being each one the ratio between the times a concept has been assigned to a video or content during a period of time, and all the videos or content processed during this same period of time. We differentiate the two scores by the time window being used: while "historical" uses all the videos being processed by the system, "recent" only uses a short window of time. Thirdly, a set of Score Filters are added to penalize or reward the score of those concepts that tend to create false positives. In our case, we work with year filters that force the matching to events in a certain year (e.g. Olympic Games or Elections), as well as penalize some concepts we have manually identified as sources of false positives (e.g. "Book", "BookSeries", "MusicGroup", "MusicAlbum", "MusicComposition", "MusicVenue", "MovieSeries", "Movie"). Other embodiments could use different filters for the same purpose. A minimum threshold is set for the concept intra-score which discards those concepts not reaching it.

The concept inter-score exploits the information contained in the relational matrix R of the KG, introduced in Section 3. For each concept candidate of a given keyword (SnKi), the relation between it and other concept candidates from other keywords is computed from matrix R by adding all relations between it and the other keyword's concept candidates, as expressed in the equation shown below. Notice from the equation that relations are not computed with the concept candidates of the same keyword.

$$C_{S_i} = \sum_{K_j \neq K_i} R[Sn_{K_i}, Sm_{K_j}]$$

For each concept candidate, intra- and inter-scores are summed, and only those above a predefined threshold are kept.

In case of dealing with n-gram keywords, concept candidates are extracted for the n combinations of each keyword, and a score for each part of the n-gram is generated with the method explained above. Finally, the concept with the highest score is kept for each n-gram keyword.

4.2.3 Concept Ranking

Once all video concepts are extracted, they are sorted by descriptiveness and relevance for the video. This sorting is only for display purposes. We consider more relevant those tags giving specific information, i.e. name of people appearing on the video or event being shown is more relevant than general information as video categories. Following this criteria, tags are sorted using their types, available in the ViTS KG as explained in Section 3. Moreover, tags with equal type or with an unknown type are sorted in descendant order according to their frequency of appearance and location in the source document (title, description, social networks, etc.). Finally, concepts are translated into tags by using its tag to show stored in ViTS KG, as previously introduced in Section 3.

5. Experiments

The quality of the tags generated by ViTS is assessed on a subset of videos from the YouTube-8M Dataset [see "YouTube-8M: A Large-Scale Video Classification Benchmark", Abu-El-Haija et al.]. The resulting tags from contextual information block are evaluated by human raters from the Amazon Mechanical Turk (AMT) [see "Running Experiments on Amazon Mechanical Turk", Paolacci et al.] crowdsourcing platform. This Section describes the contents of the video subset used in the experiment, the statistics of the generated tags, and the assessment of their quality with AMT. The tags, summaries and video information extracted during the experiment is publicly available.

5.1. Video Dataset

Our experiments use a subset of 13,951 videos from the public YouTube-8M video dataset [see "YouTube-8M: A Large-Scale Video Classification Benchmark", Abu-El-Haija et al.], each of them annotated with one or more tags. Given the URL from each video, the pipeline described in Section 4.2 is applied to obtain the contextual information (title, description and metadata) that our algorithm needs to extract tags. This contextual information may include different languages, given the multilingual nature of the YouTube-8M dataset. Moreover, YouTube-8M entities are also Freebase entities, which allows a comparison between the original tags and the enhanced tags that ViTS provides.

Figure 7:
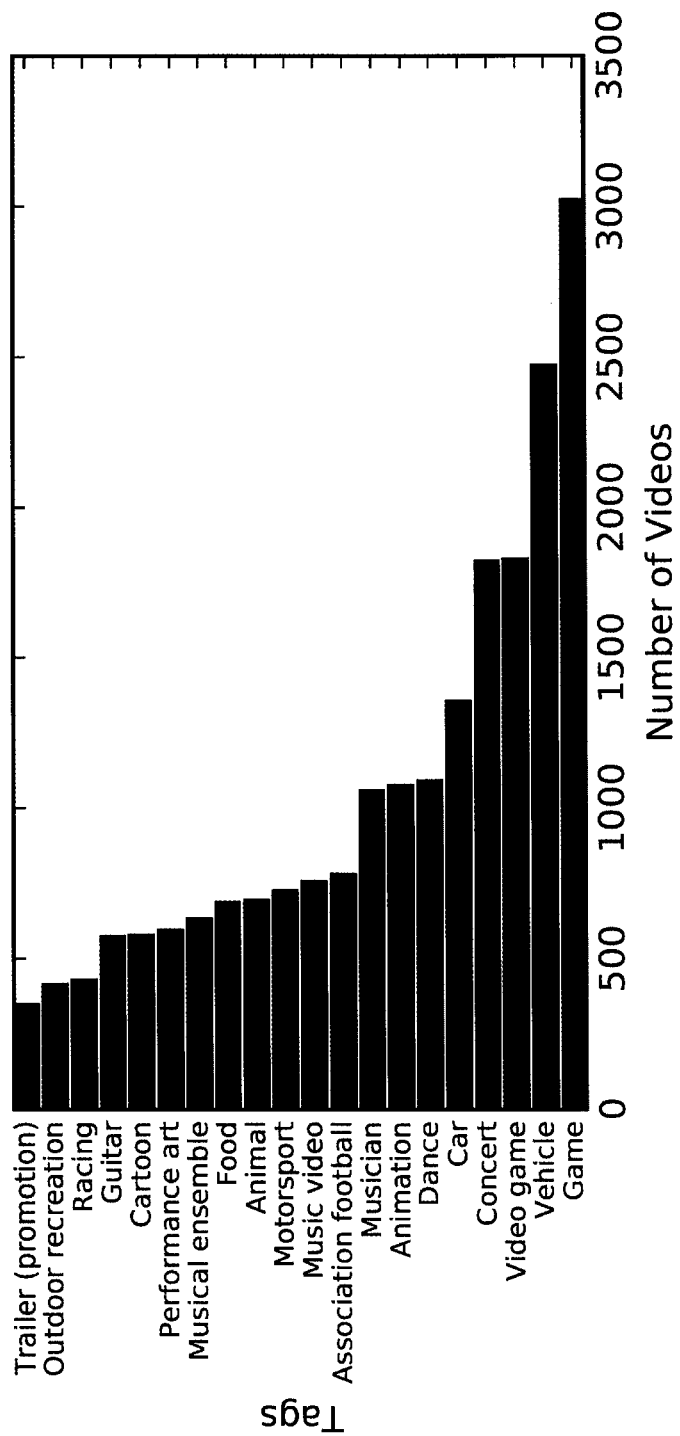
FIG. 7 illustrates a graph of tag statistics.

The 13,951 videos from the subset were randomly selected and cover a large vocabulary with a wide number of topics. FIG. 7 shows the distribution of videos included in the subset for the top-20 most repeated entities, translated into its tag to show in English. Notice how the subset has a bias towards video games, vehicles, sports and music related entities, a distribution similar to the full YouTube-8M dataset.

5.2. Tagging Statistics

Figure 8:
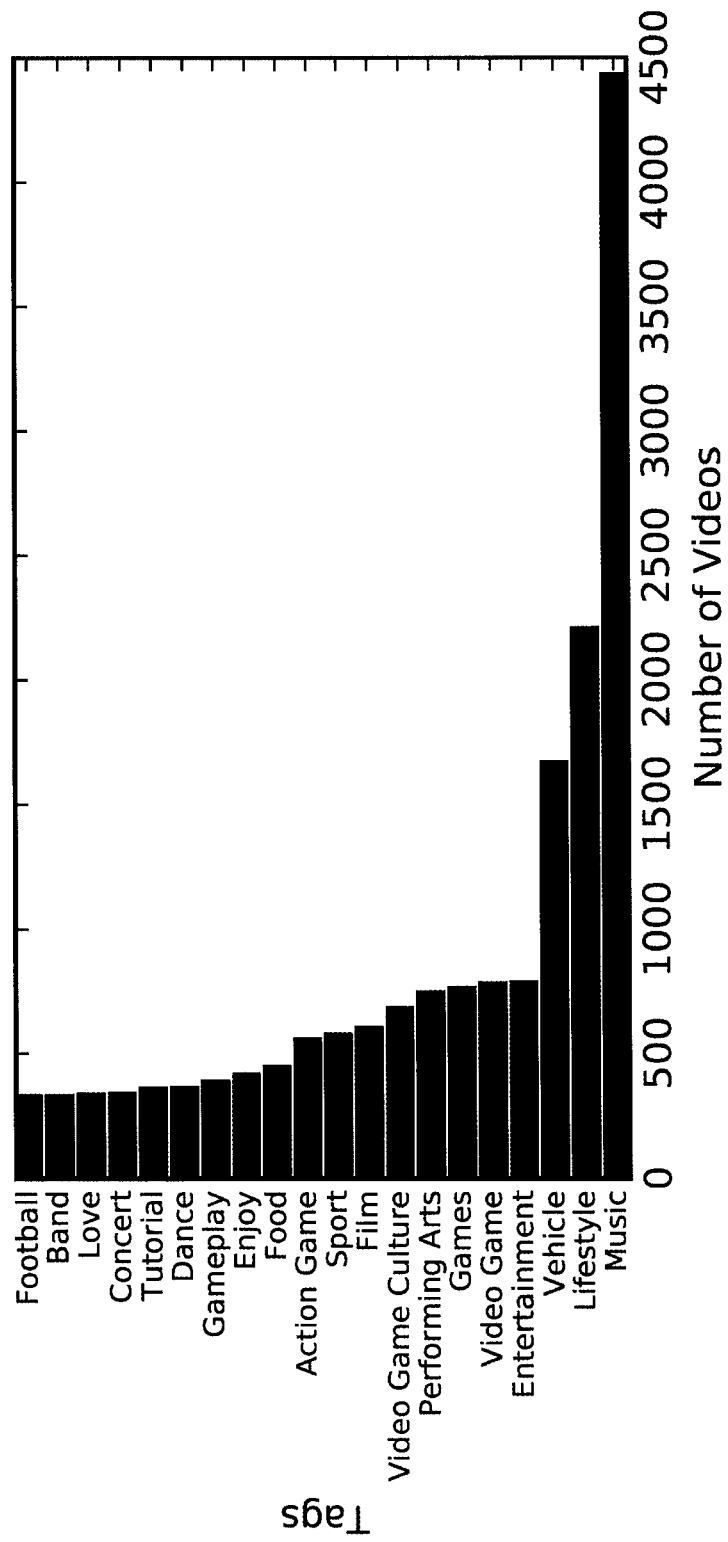
FIG. 8 illustrates a graph of tag statistics.

The final tags extracted by the Contextual Tagging Algorithm from the 14 k videos consists on a set of 34,358 distinct KG entities. In FIG. 8 we show the top-20 most repeated tags extracted by ViTS, compared to YouTube-8M's in FIG. 7. Notice a similarity on the top-level categories of the concepts: "Music", "Vehicles", "Video Games", "Food" and "Sports".

Figure 11:
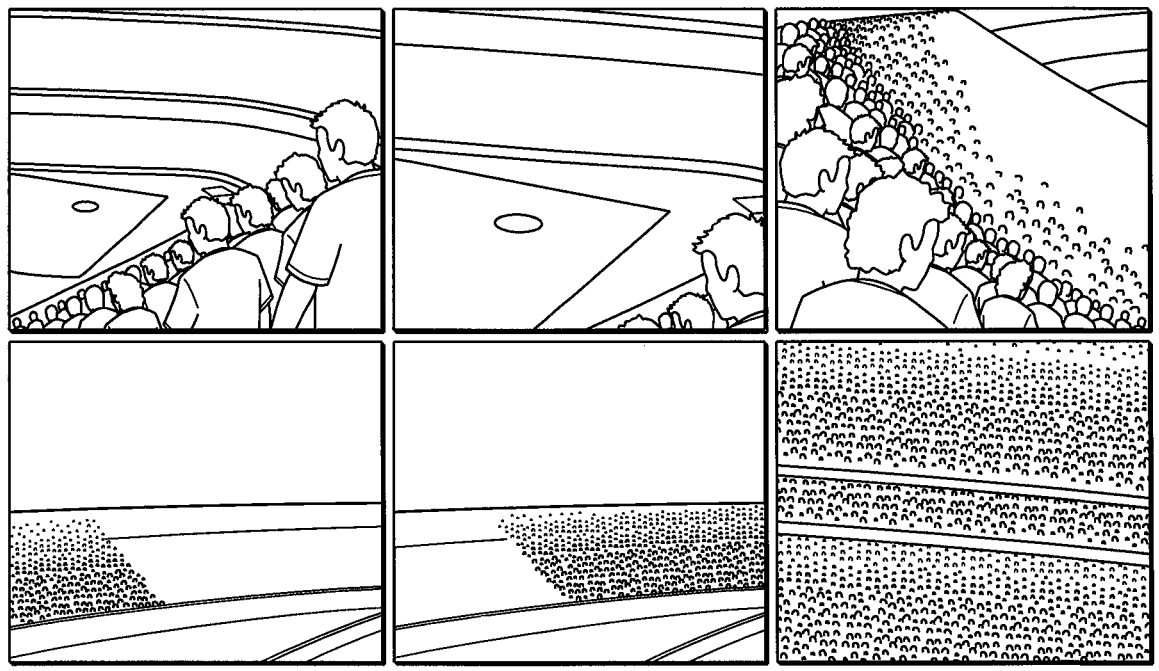
FIG. 11 illustrates a comparison of tagging results.
Figure 12:
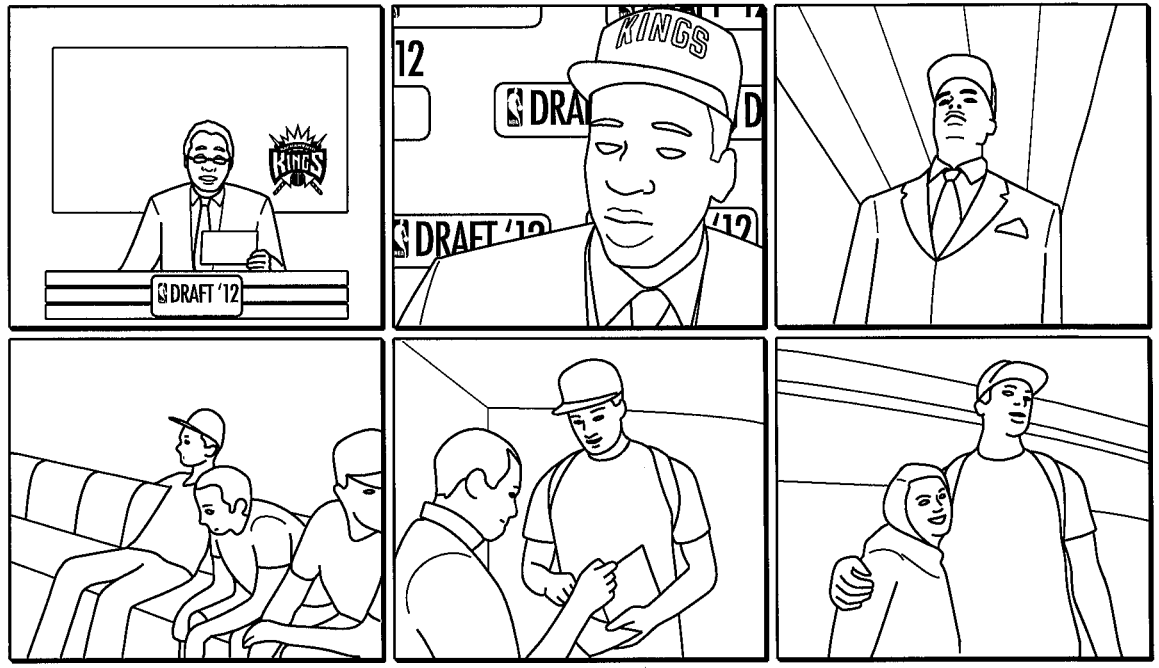
FIG. 12 illustrates a comparison of tagging results.
Figure 13:
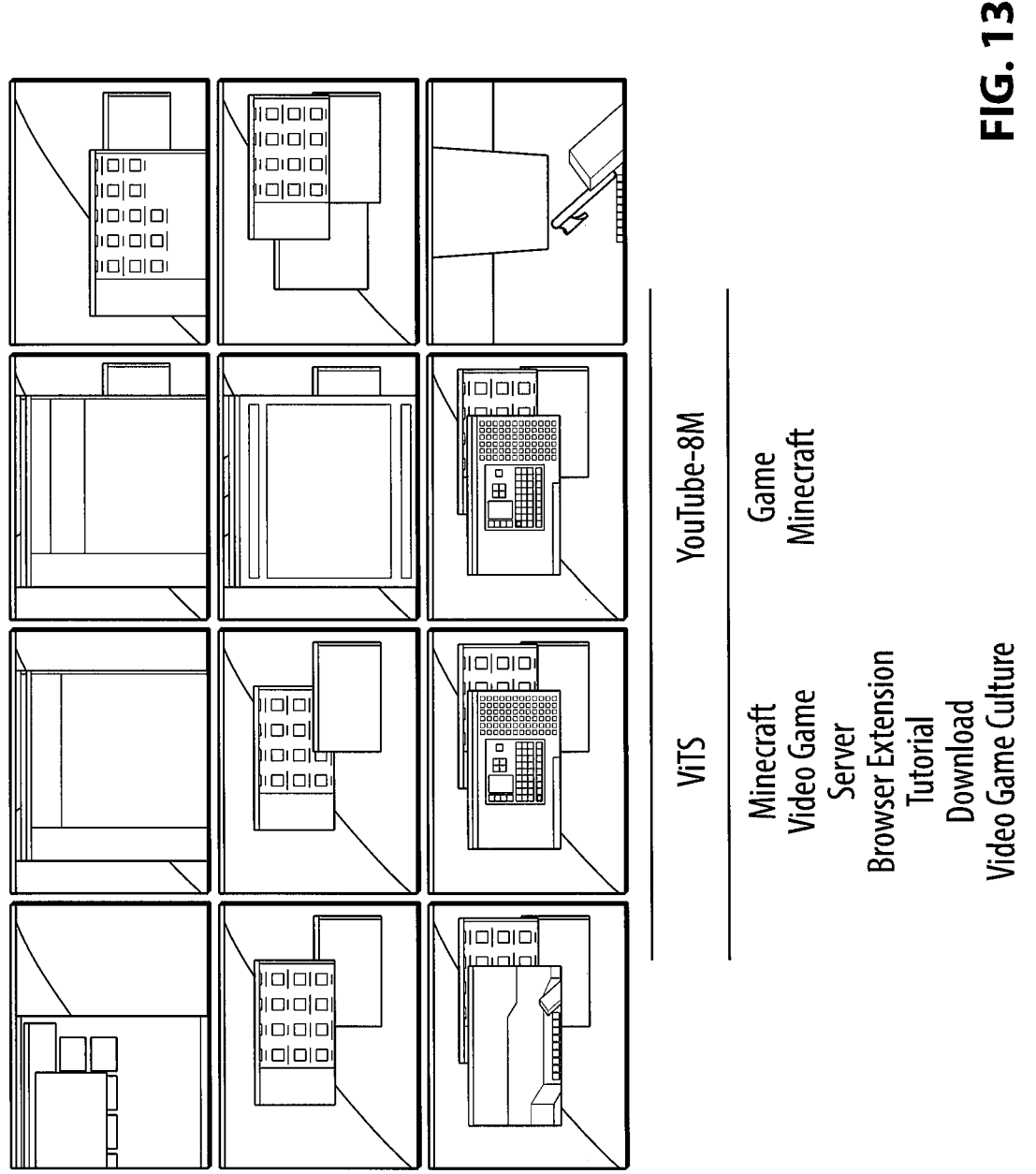
FIG. 13 illustrates a comparison of tagging results.

The average number of tags per video extracted by ViTS is 10.04, while the average number of tags in YouTube-8M dataset for the same subset of videos is 3.64. Nevertheless, in YouTube-8M tags have gone through a vocabulary construction, where all entities must have at least 200 videos in the dataset, and also only tags with visual representation are allowed, as described in [see "YouTube-8M: A Large-Scale Video Classification Benchmark", Abu-El-Haija et al.]. In FIG. 11, FIG. 12 and FIG. 13 we show a comparison of ViTS tags with respect to YouTube-8M ground truth tags for three videos. Notice the specificity of our tags and the higher quantity of tags ViTS provides.

Table 3 contains the average number of tags extracted depending on the language of the contextual information. Language is recognized by using a Wikipedia based language detection algorithm [see "Language Detection Library for Java", Shuyo]. When we do not recognize the language (null in the table), we treat it as being English. Notice how most of the videos in the subset are in English, produces a bias on the KG Vocabulary, which is larger for English aliases. Also, relations of English topics are better learned than others. As a consequence, the average number of tags per video is higher when the contextual information is in English.

TABLE 3

| Language | #Videos | Average #Tags |
|---|---|---|
| en | 6,806 | 12.11 |
| null | 5,297 | 8.83 |
| es | 450 | 5.99 |
| de | 246 | 6.53 |
| it | 227 | 6.39 |
| id | 140 | 6.54 |
| pt | 135 | 4.54 |

TABLE 3-continued

| Language | #Videos | Average #Tags |
|---|---|---|
| nl | 104 | 8.15 |
| fr | 90 | 5.68 |
| ca | 52 | 5.15 |
| ro | 49 | 6.83 |
| tl | 42 | 4.02 |
| af | 34 | 5.58 |
| hr | 30 | 6.06 |
| no | 28 | 5.92 |
| Total | 13,951 | 10.04 |

5.3. Human Rating of Generated Tags

The automatic annotations from the contextual information can be noisy and incomplete, as it is automatically generated from video title, description, metadata and user comments on social networks. The quality of the automatically generated tags was assessed by human workers from the Amazon Mechanical Turk (AMT) online platform. The tags from 1.4 k randomly selected videos were shown to AMT workers, limiting the experiment to videos in English and workers located in the United States.

Figure 14:
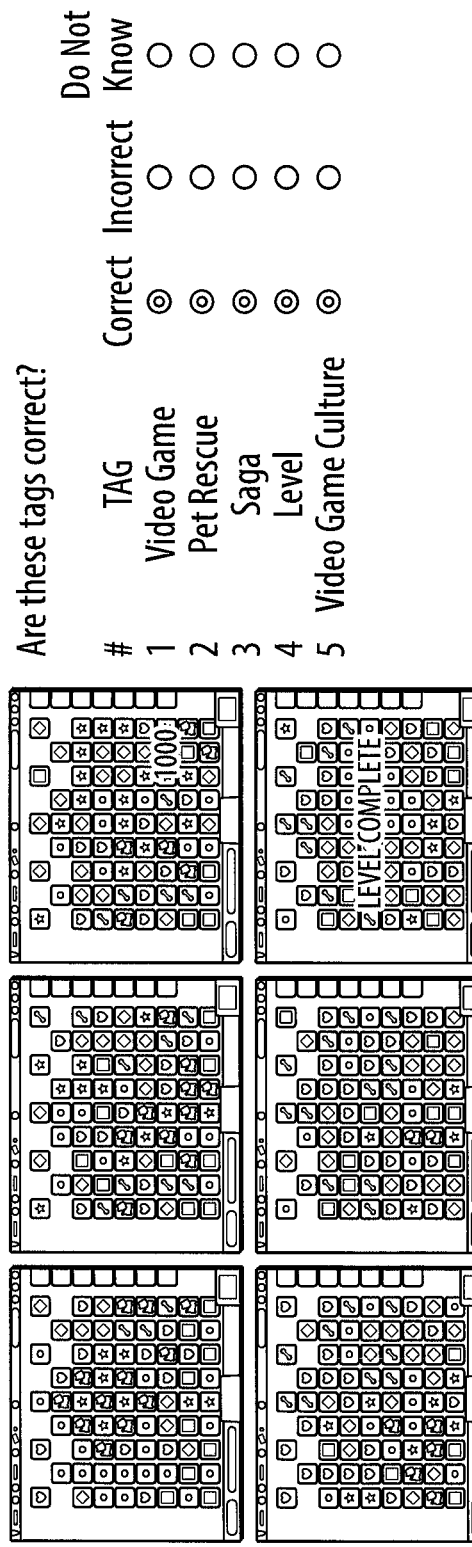
FIG. 14 illustrates an example of a tagging screen layout.

In each HIT (Human Intelligent Task) from AMT, three different workers evaluated the correctness of at most 10 tags assigned to the video, ranked according to the algorithm described in Section 4.2.3. If the video had more than 10 tags associated, the additional tags were not evaluated. The video summaries, title and description from the video were shown to the worker on the user interface depicted in FIG. 14. Workers were asked to decide if the tags were correct based on that information. For each tag, the worker was asked to select one of these options: Correct, Incorrect, Do not know. The "Do not know" option was added because tags may be sometimes very specific and difficult to recognize by a non-expert rater, but should not be considered incorrect for this reason. An answer was accepted when at least two workers agreed on it. If all three workers voted for the same option, we refer to it as "absolute correct". In case of complete disagreement, or if workers vote for majority the "Do not know" option, the tag is discarded. Tags extracted by ViTS that also appear in YouTube-8M ground truth were considered "absolute correct". Thus, these tags were not shown to the workers, but are accounted in the provided results.

Table 4 provides the accuracy results.

TABLE 4

| # Videos | # Tags Total | Accuracy | % Correct | % Incorrect | % Discarded |
|---|---|---|---|---|---|
| 1,400 | 14,024 | 80.87% | 77.81% | 18.27% | 3.90% |

We obtained a correctness of 77.81% of the tags evaluated, with a 77.31% of this tags with "absolute correctness" (agreement of all 3 human raters or already in YouTube-8M annotations). Note that typical inter-rater agreement on similar annotation tasks with human raters is also around 80% [see "Inter-Coder Agreement for Computational Linguistics", Artstein and Poesio, "Inter-Annotator Agreement on A Multilingual Semantic Annotation Task", Passonneau et al.], so the accuracy of these labels is comparable to (non-expert) human provided labels.

Figure 9:
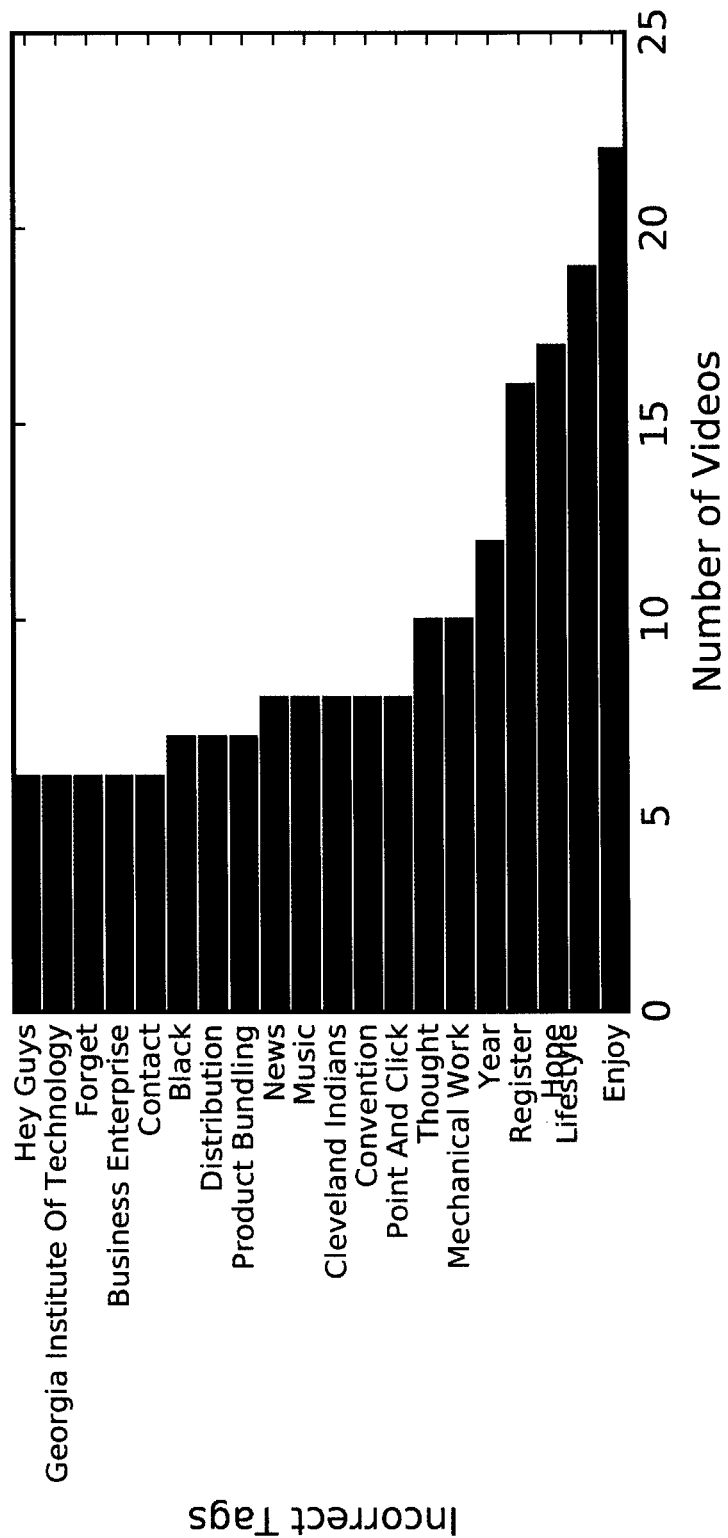
FIG. 9 illustrates a graph of tag statistics.
Figure 10:
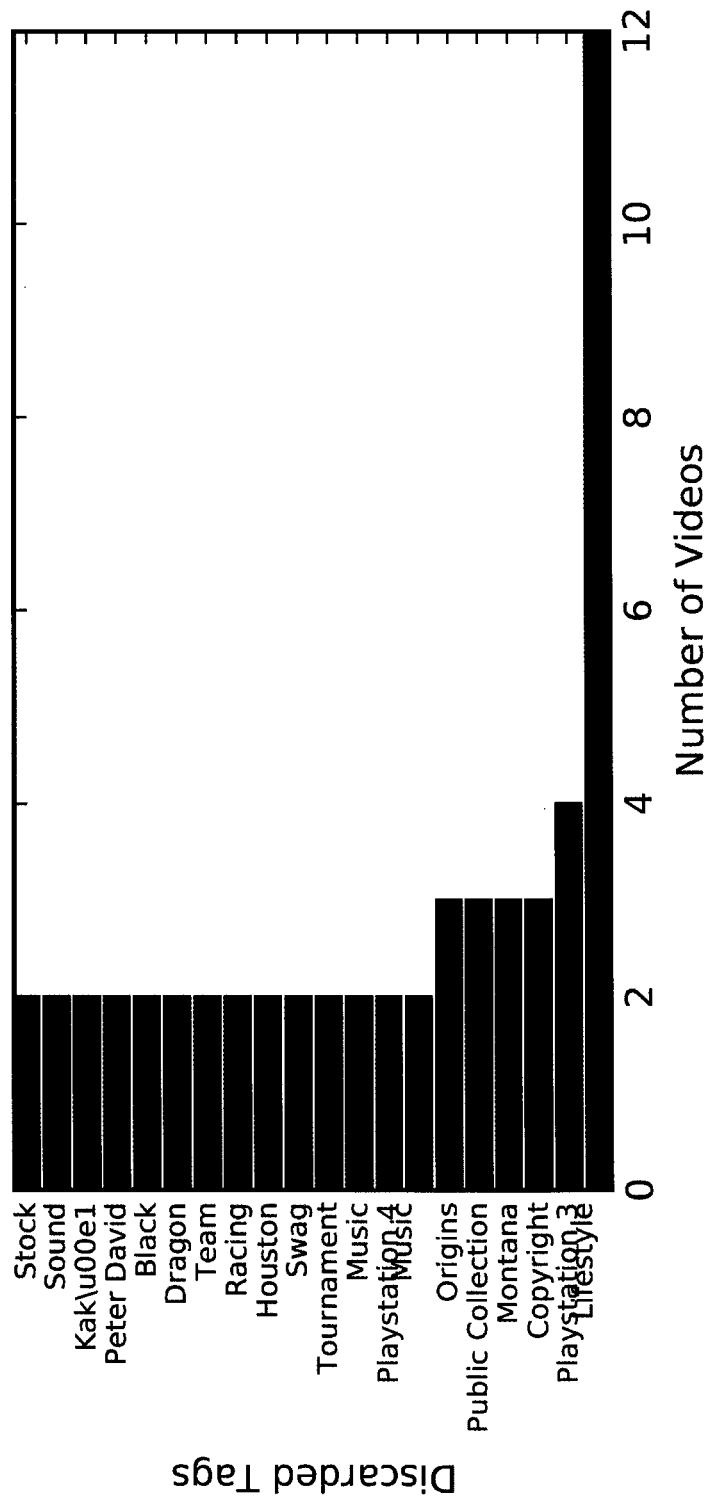
FIG. 10 illustrates a graph of tag statistics.

We also analyzed the most repeated errors and uncertain tags in FIG. 9 and FIG. 10 show the top-20 tags with most occurrences evaluated as incorrect or discarded. Notice that many of these tags are too generic concepts, such as "Lifestyle" or "Music", which are often found on automatically generated metadata. Also, most of the incorrect tags are abstract concepts, like "Enjoy", "Hope", "Year" or "Thought", that are often found on contextual information but are not descriptive nor relevant to the video. Moreover, we found some incorrect tags caused by repeated errors on the mapping from keywords to KG entities, such as "Georgia Institute of Technology" coming from the keyword "technology", "Trip Tucker" coming from "trip" or "Head of Mission" coming from "cmd" or "com".

ViTS is an industrial Video Tagging System which generates tags based on information crawled from the Internet and learns relations between concepts. The core of the system is a knowledge base that is constantly updated to capture the dynamics of the indexed concepts.

ViTS was tested on a subset of videos from the YouTube-8M dataset. The tags generated by ViTS were highly graded by human users exposed to a visual summary of the video and its metadata. The accuracy of 80.87% is comparable to the inter-annotator agreement of (non-expert) humans in the task of semantic annotation. This high quality, combined with its capability of capturing not-only visual concepts, shows the capability of ViTS as a rich video indexing system. Moreover, experiment results on Youtube-8M are publicly available.

The tagging system shows how contextual data is a powerful source of information when indexing web videos. Exploiting the relations between concepts allows generating a rich set of tags with a light computation, desirable when addressing a web scale indexing. In addition, content-based techniques can also extend the content based tags in alternative embodiments of the invention. These content-based tags can be exploited as weak labels for computer vision and audio processing deep models, which have been shown impressive recognition performances in the recent years.

In one embodiment, the invention is a tagging system that uses Deep Learning and Machine Learning to combine Multi-Domain Inputs (audio, text, image, video, video summaries and social media data) to understand the context, what is happening and be able to tag data. Such a system can learn either in an unsupervised manner and/or using reinforcement learning from audience data.

The unsupervised learning system combines three blocks in one embodiment. First, a video action summarization block that is in charge of analyzing the full video using Machine Learning (ML) techniques and selecting the relevant scenes that contain most of the video information (video summaries). Secondly, a label Retrieval block (Contextual Crawling) that queries the internet and/or social media and/or public/private datasets to find associated tags within the full video. The outputs of these two blocks (a set of images corresponding to the relevant scenes together with a set of tags) are combined through a Deep-Learning scheme to train the network in an unsupervised manner.

In some embodiments, the video action summarization block can be improved using data available (manually curated, and/or scraped on the internet and/or from the Deep Learning System described herein) to select specific people, objects or places in order to minimize the load of the Neural Networks and for faster convergence times.

Embodiments of the Label Retrieval block extracts all the data available from a specific content using a) the page where the content is published (obtaining text corpus, metadata, title and description) and/or b) social media posts where the content has been published and/or c) audio transcription for the content if available and/or d) any information associated with the content provided at the input time (through MRSS, API or any other mechanism). A set of bigrams and/or ngrams are obtained from these inputs, which are used to keyword social networks to find any relevant social media post that is related to that content. Once a set of text/keywords is obtained, the keywords are parsed to a universal semantic representation system when available. Machine Learning methods involving Natural Language Processing and Name Entity Recognition and/or RAKE can be involved in this step. The Label Retrieval block outputs a set of concepts that better represent the content which are then used by the Deep Learning Block.

Embodiments of the Deep Learning block are aimed at converging into a visual representation of all the concepts present in the dataset. This knowledge is obtained by combining the summaries obtained on the video summarization block and the labels pertaining to the content. A neural network is trained to tag individually these video summaries (and/or the images extracted from the summaries) with the right tags. Such Neural Network has an end layer in charge of aggregating the feature vectors from each of the video summaries, obtaining the video tags and calculating the loss figure.

In an embodiment of the Deep Learning Block, extra information regarding the nature of the concepts/tags (obtained through manual curation or through the aggregation of relationships between concepts/tags in the form of word embedding or clustering) can be added to improve convergence speed.

Embodiments of the basic semantic unit generated by the Tagging System are concepts in a Knowledge Graph (KG). These concepts correspond to universal semantic representations of words. While words are dependent from a specific language, concepts are represented by words from different languages. The semantics associated to the concepts can be refined and updated based on the new information. Concepts allow to merge synonymous keywords or alias under the same concept ID, i.e. the US basketball team "Golden State Warriors" is also referred as "San Francisco Warriors" or "Dubs", so they all represent the same semantics. Concepts are also useful to discriminate between homonym words, i.e. the word "Queen" would map to a music band concept if appearing in a music-related context, while it would be mapped to "Elizabeth II" if appearing in a context related to the British monarchy.

The relationships between concepts on the Tagging Systems are obtained a) by the data that the tagging system has "seen" (the relationships obtained by the co-occurrence of concepts in contents), and/or b) by manually curated data, and/or c) by crawled data (i.e. from Wikipedia) and/or d) by the time-dependent relationships between contents described as trends also location. These relationships are used by the tagging system to understand the context of a given content and to filter out possible errors of the visual tagging, audio tagging or contextual tagging modules.

In some embodiments, the tagging system can detect when the confidence level at predicting one concept is lower than a threshold, or when more information is required for a given concept. When this happens, required data can either be requested to end users, obtained on the internet or derived from audience data. Audience data can always be used to detect that a tag or set of tags is not correct, and used to clean the training dataset. The training dataset can be iterated after the tagging system has been trained, to allow for cleaning and faster convergence times in the future.

In an embodiment of the invention, a self-learning and/or self-healing system is implemented that does predictions based on its subsystems and improves itself by comparing the expected outcome of the prediction with the resulting impact that the prediction had (in the form of audience feedback or other data). In such system, the information is processed in several layers using ML and/or DL. The output of the system is a prediction which is then sent to the audience or compared to data to obtain feedback. This is later used by the reinforcement learning block to improve the behavior of all the layers involved in the prediction.

Figure 15:
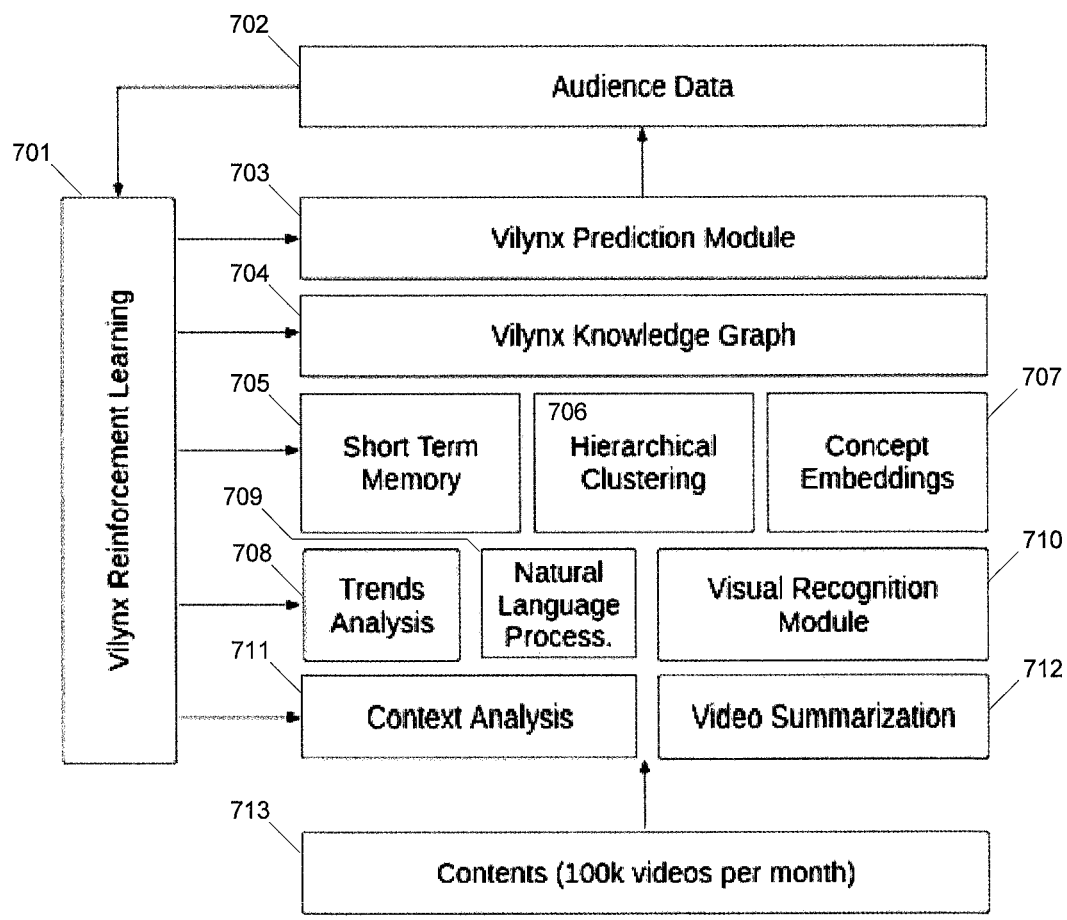
FIG. 15 illustrates a block diagram of an embodiment of the invention.

An illustration of a block diagram of an embodiment of such system is shown in FIG. 15. In this embodiment, the Contents 713 are passed to the Context Analysis 711 and Video Summarization 712 modules. The Context Analysis Module 713 processes the information and obtains a set of keywords. This information is combined with Trends Analysis 708 (what is currently trending) and the NLP Modules 709. The Video Summarization Module 712 detects the most relevant parts of the video content (if available) and passes a set of relevant actions and frames to the Visual Recognition Module 710, which detects concepts appearing with an output confidence level. The information from contextual and video analysis is then combined through the means of Concept Embeddings 707, Hierarchical Clustering 706 (which is a higher abstraction layer from concept embeddings that models the relationships between them in a hierarchical way) and Short Term Memory 705 (the knowledge that such system has about what happened in a short-memory span). All these inputs are integrated with the Vilynx Knowledge Graph 704, which outputs a prediction 703 (content prediction, tagging and/or other predictions). The prediction is then sent to the audience 702 and its response to such prediction is analyzed on the Vilynx Reinforcement Learning Module 701. The latter is used to provide feedback to each of the modules in order to improve the different layers of the system.

The present invention has been described above in connection with several preferred embodiments. This has been done for purposes of illustration only, and variations of the inventions will be readily apparent to those skilled in the art and also fall within the scope of the invention.

What is claimed is:

1. A computer implemented method of training an automatic system for tagging digital media, comprising the steps of:
    receiving one or more videos;
    analyzing said one or more videos;
    selecting one or more scenes from within each of said one or more videos to create at least one summary for each of said one or more videos;
    causing a query of one or more electronic sources of digital information external to the system, wherein said querying comprises extracting keywords related to said one or more videos from a combination of web pages and social media networks;
    performing mapping between said extracted keywords and one or more entities of a knowledge graph (KG);
    generating tags associated with each of said videos based, at least in part, on said mapping; and
    processing, using at least one processor, said summary and said tags associated with each of said videos to train a network configured for automatic tagging of video summaries.

2. The method of claim 1, wherein said step of selecting uses machine learning techniques to selects relevant scenes that contain most of the significant video information from each of said videos.

3. The method of claim 1, wherein said step of causing uses said machine learning techniques comprising one or more techniques from the set consisting of: natural language processing, name entity recognition, and keyword extraction.

4. The method of claim 1, wherein said electronic sources include: the public Internet; and said step of causing a query of one or more electronic sources of digital information external to the system comprises extracting data from a page where at least one of the one or more videos is published.

5. The method of claim 1, wherein said electronic sources include: social media sites; and said step of causing a query of one or more electronic sources of digital information external to the system comprises extracting data from a social media page associated with the one or more videos.

6. The method of claim 1, wherein at least one of the one or more electronic sources of digital information external to the system include: audio, textual, image, video, or video summary data associated with said one or more videos.

7. The method of claim 1, wherein the step of processing uses deep learning to train a neural network in an unsupervised manner.

8. The method of claim 7, wherein the neural network has an end layer in charge of aggregating feature vectors from each of the video summaries, obtaining video tags, and calculating a loss figure.

9. The method of claim 7, wherein the step of processing uses information regarding the nature of the concepts and tags.

10. The method of claim 1, wherein the step of processing uses reinforcement learning from audience data.

11. The method of claim 1, wherein said step of processing maintains concepts in the KG, and wherein said concepts correspond to semantic representations of words.

12. The method of claim 11, wherein the semantic representations corresponding with said concepts are updated in said KG based on new available datasets.

13. The method of claim 11, wherein relationships between concepts are stored in said KG and used to process information.

14. The method of claim 13, wherein said relationships utilize relationship matrices or concept-to-vector representations.

15. The method of claim 1, wherein the network is configured to detect a confidence level associated with a tag for a video summary.

16. The method of claim 1, wherein said step of selecting uses external data to select specific people, objects, or places.

17. A computer implemented method of training an automatic system for tagging digital media, comprising the steps of:

receiving one or more videos;

analyzing said one or more videos;

selecting one or more scenes from within each of said one or more videos to create at least one summary for each of said one or more videos, wherein said selecting further comprises using machine learning techniques to select relevant scenes that contain significant video information from each of said videos;

causing at least one processor to query one or more electronic sources of digital information external to the system, wherein said querying comprises extracting keywords related to said one or more videos from a combination of web pages and social media networks;

performing mapping between said extracted keywords and one or more entities of a knowledge graph (KG);

generating tags associated with each of said videos based, at least in part, on said mapping, wherein said generation of tags further comprises using machine learning techniques comprising one or more techniques from the set consisting of: natural language processing, name entity recognition, and keyword extraction; and processing said summary and said tags associated with each of said videos to train a network configured for automatic tagging of video summaries, wherein training said network comprises using deep learning to train the network in an unsupervised manner and maintaining concepts in the KG, wherein said concepts correspond to semantic representations of words.

18. The method of claim 17, wherein said electronic sources include: the public Internet; and said step of causing a query of one or more electronic sources of digital information external to the system comprises extracting data from a page where at least one of the one or more videos is published.

19. The method of claim 17, wherein the semantic representations corresponding with said concepts are updated in said KG based on new available datasets.

20. The method of claim 17, wherein relationships between concepts are stored in said KG and used to process information.

* * * * *

UNITED STATES PATENT AND TRADEMARK OFFICE
CERTIFICATE OF CORRECTION

PATENT NO. : 11,256,741 B2
APPLICATION NO. : 16/346102
DATED : February 22, 2022
INVENTOR(S) : Elisenda Bou Balust et al.

It is certified that error appears in the above-identified patent and that said Letters Patent is hereby corrected as shown below:

In the Claims

Claim 2, at Column 16, Line 63 - replace "selects" with -- select --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*